Oct. 5, 1954  W. W. SLOANE  2,690,903
LONGWALL CUTTER AND RECIPROCATING WEIGHT THEREFOR
Filed Oct. 17, 1952  5 Sheets-Sheet 1

*INVENTOR.*
WILLIAM W. SLOANE
BY
*Murray A. Gleeson*
*ATTORNEY*

Fig. 3

INVENTOR.
WILLIAM W. SLOANE
BY
Murray J. Gleeson
ATTORNEY

Oct. 5, 1954  W. W. SLOANE  2,690,903
LONGWALL CUTTER AND RECIPROCATING WEIGHT THEREFOR
Filed Oct. 17, 1952  5 Sheets-Sheet 5

Fig. 6

*INVENTOR.*
WILLIAM W. SLOANE
BY
Murray G. Gleeson
*ATTORNEY*

Patented Oct. 5, 1954

2,690,903

UNITED STATES PATENT OFFICE 2,690,903

LONGWALL CUTTER AND RECIPROCATING WEIGHT THEREFOR

William W. Sloane, Chicago, Ill., assignor to Goodman Manufacturing Company, Chicago, Ill., a corporation of Illinois Application October 17, 1952, Serial No. 315,337

5 Claims. (Cl. 262—8)

The invention relates generally to machines for mining coal or the like and relates particularly to a continuous mining machine for use in the longwall method of mining.

Previous machines for continuously mining coal by the longwall method have entailed the use of scoops or buckets mounted on supports or frames which are moved along the working face by draft means which with the scoops operate to plow or plane the coal from the seam. In such machines the draft means are subjected to loads ranging from 6,000 pounds to 40,000 pounds depending upon the hardness of the coal and the depth of cut, and no provision has heretofore been made whereby the scoop or bucket is additionally implemented by impact forces when the steady load on the draft means is insufficient to remove the coal.

In carrying out the present invention a pick or cutter is maintained in contact with the face by draft means connected to a frame supporting the pick. Impulses against the coal are provided by the cutter and a reciprocating weight having desired velocity and acceleration characteristics, the weight being connected to the cutter by a linkage and being so arranged that the changing momentum of the weight is transmitted by the linkage into the cutter in the form of an impulse of short duration.

The impulses transmitted into the cutter create conditions of localized stress in the coal so that it is planed or plowed from the seam and on to a flight conveyor. Such impulses are of extremely short duration, and greatly exceed the crowding force against the cutter caused by the draft means, but at all times the crowding force is kept to a constant minimum. During times when the cutter encounters resistance, the reciprocating weight will provide continued impulses through the medium of the linkage until the coal is weakened by such continued impulses and is planed from the seam, the draft means maintaining the cutter against the seam at all times while it is encountering resistance.

The machine according to the present invention is also characterized by being able to operate readily in either direction along the face of the seam, the cutter having cutting edges at each end thereof, and being capable of exerting a combined shearing and punching force in either direction. Operation in the opposite direction is achieved by a pair of selective gear trains chosen to give desired angular velocities to a crank and connecting rod connected to the reciprocating weight, one such gear train being operable for one direction of working movement of the cutter, the other gear train being operable for the other direction of working movement of the cutter.

With the foregoing considerations in mind it is a principal object of the invention to afford an improved machine for the continuous mining of coal by the longwall method, and to exert a combined punching and shearing action against the coal of such seam, and to employ the punching forces to minimize the crowding force exerted by the draft means.

Other objects and important features of the invention will be apparent from a study of the following specification taken with the drawings which together illustrate a preferred embodiment of the invention and what is now considered to be the best mode of applying the principles thereof. Other embodiments of the invention may be suggested to those having the benefits of the teachings herein and it is therefore intended that the invention not be limited by the precise embodiment shown, nor otherwise than by the scope and purview of the subjoined claims.

General description of machine

Figure 1:
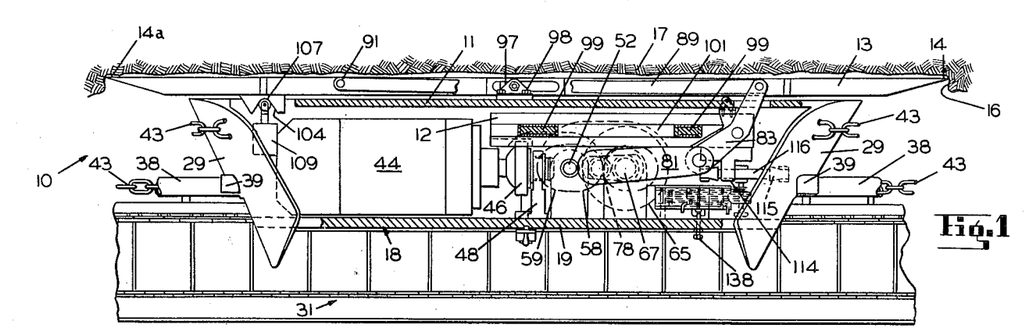
Fig. 1 is a general top plan view of the improved continuous mining machine according to the present invention.
Figure 2:
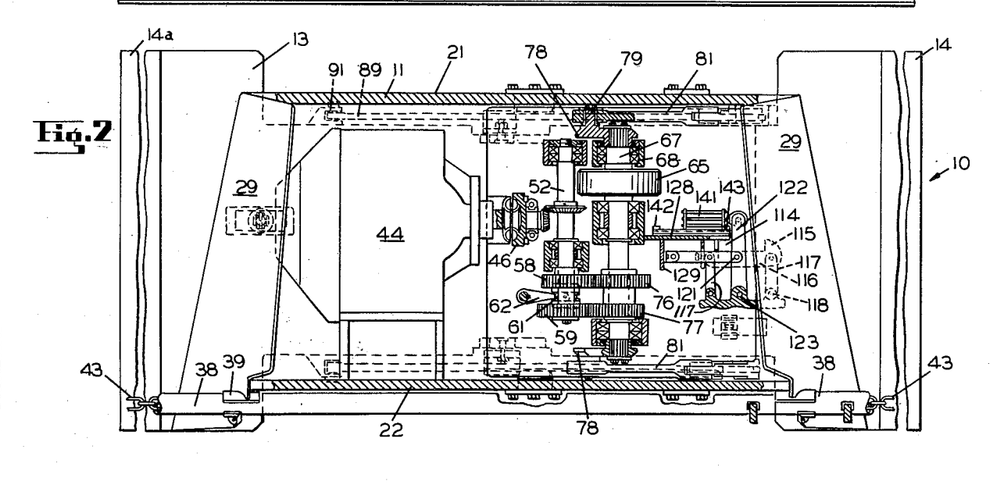
Fig. 2 is a general front elevation view thereof.

Referring now particularly to Figs. 1 and 2 of the drawings the improved machine according to the present invention is referred to generally by the reference numeral 10, and includes a main vertical frame 11 which forms part of an enclosure for a reciprocating weight 12 arranged to impart an impulse into a cutter or pick 13, so that the points 14 or 14a thereof will bear against an exposed bench 16 of a coal seam 17 to shear or plane the coal from the seam 17. The machine 10 is particularly adapted to the long wall system of mining instead of the usual room and pillar method of mining and is so arranged as to traverse the length of the seam 17 while the cutter tip 14 or 14a of the pick 13 is planing the coal therefrom.

Figure 3:
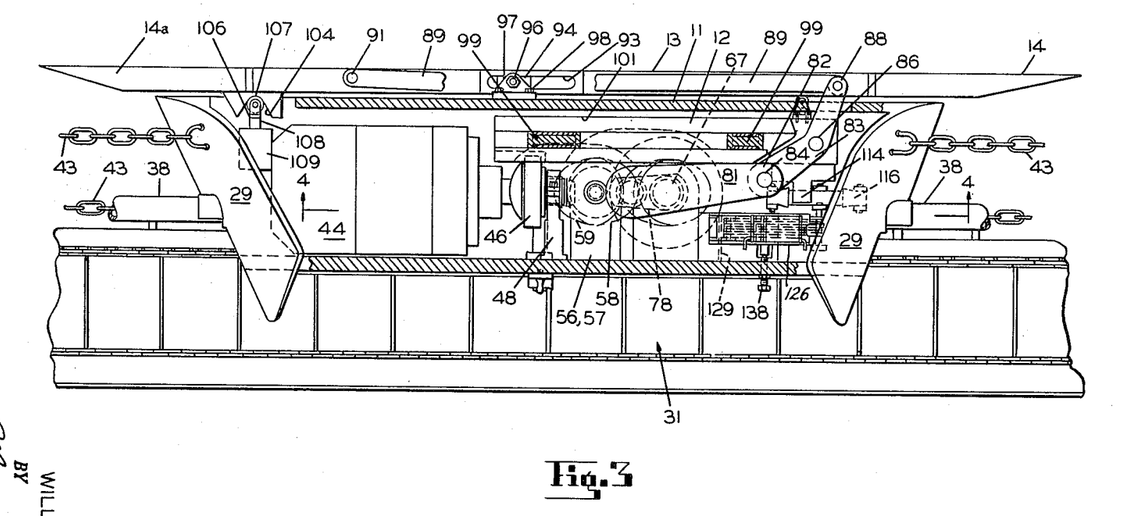
Fig. 3 is a detailed plan view to a larger scale of the machine of Fig. 1, showing details of the operating mechanism thereof.

The main frame 11 forms a support for a housing indicated generally by the reference numeral 18, see also Fig. 3, the housing 18 including a front wall 19, a top cover 21 and a lower base plate 22. The top cover 21 and the base plate 22 are secured to the front wall 19 as by weldments 23, 24, and the top plate 21 and the lower base plate 22 are provided with flanges 26 and 27 whereby the housing 18 may be held to the main frame 11 as by cap screws 28.

Referring back again to Figs. 1 and 2 of the drawings, the frame 11 is provided at each end thereof with deflecting vanes 29, 29, the lower edges of which rest upon the mine floor. The vanes 29 are spaced a distance back from the cutter tips 14 and 14a, and are arranged to flare back upon a double strand flight conveyor indicated generally by the reference numeral 31, so that as the coal is sheared from the face 17 by the cutter tip 14 or 14a it will be directed on to the flight conveyor.

The flight conveyor 31 includes side channel sections 32 which are spanned by a web number 33 forming a support for the upper reach of flights, the lower or return reach having its ends resting upon the lower flanges 34 of the channel members 32. The channel members are supported at intervals throughout their length upon shoes 36 resting upon the mine floor.

Figure 5:
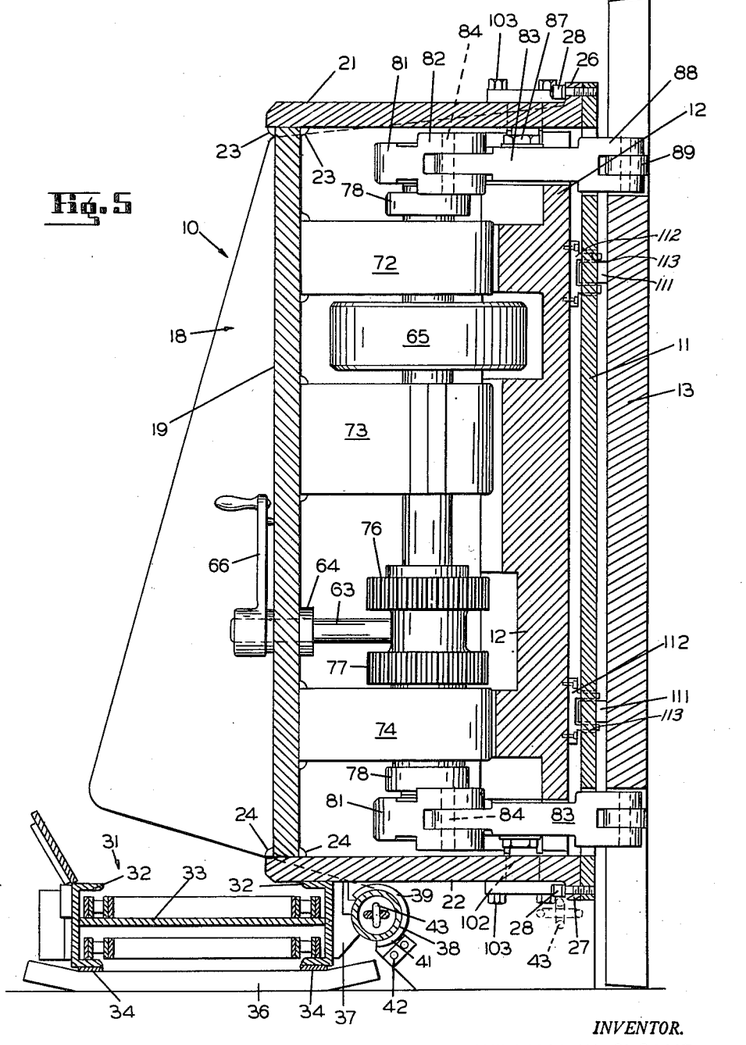
Fig. 5 is a transverse section taken substantially along the line 5—5 of Fig. 4 looking in the direction of the arrows.

The channel member 32 positioned closest to the seam 17 is provided at intervals throughout its length with a bracket 37 for a tubular support rail 38 for the mining machine 10. As best seen in Fig. 5, the lower part of the deflecting vane 29 is provided with a semi-cylindrical flange 39 resting upon the tubular rail 38, the deflecting vanes and the frame 11 being prevented from riding up out of engagement with the tubular rail by a flange member 41 bolted to the deflecting vane by bolts 42. It will be seen that the flange members 38 and 41 embrace more than 180° of central angle of the tubular rail 38 so as to hold the deflecting vanes 29 and the frame 11 to the rail 38 at all times.

The machine 10 is arranged to be moved along the face 17 by draft chains 43 which are connected to suitable winches or hoists, not shown, disposed beyond the ends of the seam 17. As seen in Fig. 3, the return run of the chain 43 is guided within the tubular rail 38, so that the machine traverses the face 17 in either direction the return run of the chain will be suitably protected against being run over by the machine. It may be noted that the hoists or winches disposed at each end of the seam 17 are so arranged that one is inoperative while the other is pulling the machine across the face 17.

*Description of impulse transmitting mechanism for cutters*

Figure 4:
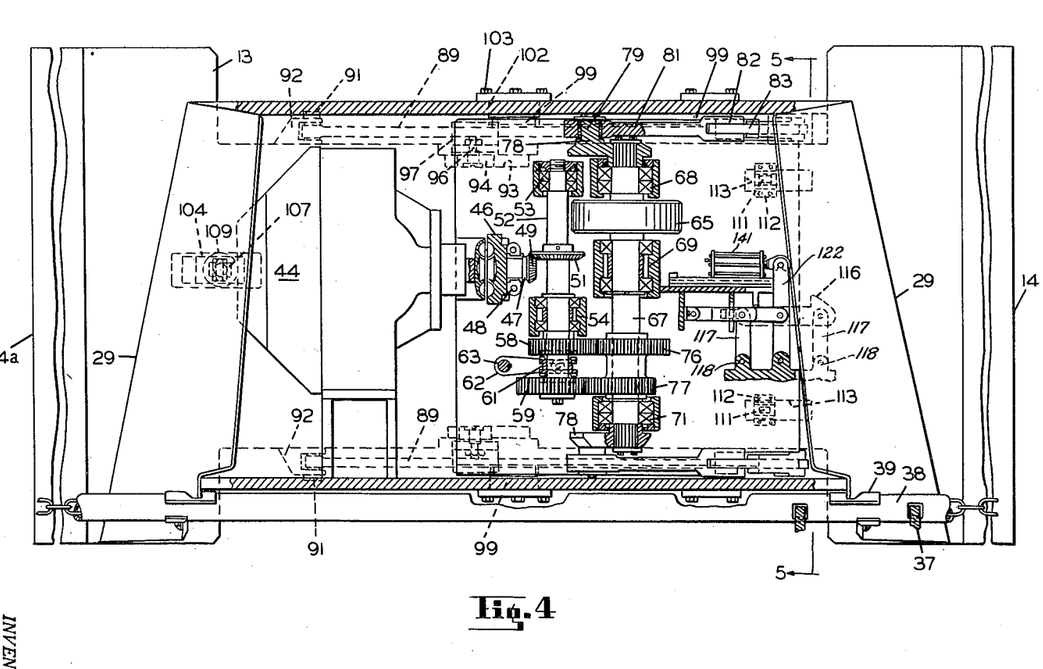
Fig. 4 is an elevation view taken inside the front wall of the machine, said view being taken substantially along the line 4—4 of Fig. 3.

Referring particularly to Figs. 3 and 4 of the drawings, reciprocating movement is given to the weight 12 by means of a motor 44 supported in any convenient fashion on the forward wall 19 of the housing 18. The motor 44 is connected through a fluid coupling and flywheel 46 to turn a stud shaft 47 mounted in a bearing support 48 secured to the wall 19 of the housing 18. A miter gear 49 is made fast to the end of the stub shaft 47, and meshes with a miter gear 51 fast upon a lay shaft 52 supported in bearings 53 and 54. Standards 56, 57 are provided to mount the bearings 53 and 54, and are secured to the front wall 19 in any convenient fashion.

The lay shaft 52 is provided with a pair of eccentrically mounted pinions 58 and 59 which are selectively connected to be driven by the lay shaft 52 by means of a splined clutch 61 splined to the lay shaft 52. The spline clutch 61 is shifted to a position of engagement with either gear 58 or 59 by means of a shift lever 62 made fast to a rock shaft 63 turning within a boss 64 on the inside of the front wall 19, as seen more particularly in Fig. 5. A handle 66 is made fast to the rock shaft 63 so that the lever 62 can shift the spline clutch 61 to position of clutching engagement with either pinion 58 or 59.

A crank shaft 67, see particularly Fig. 4, is supported on bearings 68, 69 and 71 which are respectively mounted in bearing standards 72, 73 and 74, said bearing standards being secured in any convenient fashion to wall 19 of the housing 18, see particularly Fig. 5. The crank shaft 67 has fast thereon a pair of variable speed gears 76 and 77 of the type as disclosed in Sloane Patent No. 2,585,971, issued February 19, 1952, for Gearing. Said gears are designed to give desired angular velocity to the crank shaft 67 when meshing with eccentrically mounted pinions 58 or 59 mounted upon the lay shaft 52. A flywheel 65 is mounted on the shaft 67 to give desired rotational inertia to the shaft, so that loads transmitted by the motor 44 and crank shaft 67 will not appreciably affect the speed thereof.

Each end of the crank shaft 67 is fitted with a crank 78 having a crank throw 79. A connecting rod 81 is mounted on the throw 79 and is provided with a clevis 82 at one end thereof. A bell crank 83 is connected by a pin 84 to the connecting rod 81 at the clevis 82, and is pivoted at 86 to the reciprocating weight 12, the link being held pivotally to the weight by a cap bolt 87 tapped into the weight 12. The opposite end of the bell crank 83 terminates in a clevis 88 which forms a point of connection to a drag link 89 hingedly connected at 91 to a bracket 92 mounted along the top of the pick 13 as seen in Fig. 4.

It will be noted from Fig. 4 that the assembly for linking the crank shaft to both the reciprocating weight 12 and the cutter 14 are disposed on both the top and bottom edges of the cutter 14 and the weight 12. The description obtaining for one such assembly, which assembly has been described in connection with the upper assembly, is believed to suffice for the lower of such assemblies.

The cutter 13 is guided in its position alongside the frame 11, and between the frame 11 and the face of the seam 17 by means of a slot 93 disposed in the top and the bottom of the cutter 13, and a block 94 arranged to be held on a pin 96 held in an angle member 97 bolted at 98 to the outside of the frame 11.

The weight 12 is guided in its reciprocating movement by guide blocks 99 which ride in a groove 101 formed in both the top and the bottom of the reciprocating weight 12. The guide blocks 99 are inserted through apertures 102 in the top cover 21 and the bottom plate 22 and are held in position by cap screws 103.

The variable speed gear 77 and the crank 78 are arranged to transmit through the connecting rod 81 a desired motion to the bell crank 83, which when the cutter 14 is in contact with the bench 16, will in turn transmit a linear motion to the reciprocating weight 12. The linear motion of the weight 12 is so chosen that upon a change in momentum thereof an impulse will be transmitted by the bell crank 83 into the cutter 14 so as to cause the coal to be sheared or planed from the seam 17. The precise details of the motion of the weight 12 to give the desired impulse against the bit 14 is discussed in more detail in the co-pending application of William W. Sloane, Serial No. 293,958 filed June 17, 1952, for Mechanical Miner.

In the other direction of movement when the cutter tip 14a is in engagement with the seam 17, the gear 76 is drivably connected with the eccentric pinion 58 so that the proper velocity is imparted to the weight 12 for creating impulses against the cutter 14a.

*Description of crowd for cutting*

Means are provided so that the crowding action of the draft chain 43 is maintained against the cutter 14, and in such a fashion that while the crowding force is maintained against the seam 17, the cutter may move together with the weight 12 with respect to the draft means 43 effecting crowding movement. To this end the cutter arm 13 is provided with a V-shaped cam 104, the throat of the V being in a direction toward the housing 18. The cam 104 cooperates with a cam follower arm 106 having a cam roller 107 at the end thereof. The cam roller 107 rides upon the V-cam surface 104, and the movement of the roller 107 in a direction as would be occasioned by the movement of the cutter arm 13 either in a forward direction to the right as seen in Fig. 3, or in a rearward direction, is opposed by a piston rod 108 connected to a piston, not shown, slidable in a cylinder 109. The cylinder 109 is secured to the housing of the motor 44 in any convenient fashion as seen more clearly in Figs. 3 and 4.

The movement of the cutter 13, as would occasion the riding of the cam roller 107 upon either of the V-cam surfaces 104, would normally tend to cause the arm 13 to rock about the pin 96. However, the reciprocating weight 12, see particularly Figs. 4 and 5, is provided with stabilizing rollers 111 mounted on brackets 112 secured to the side of the weight 12 where it is nearest to the frame 11. As seen in Fig. 4, the frame 11 is provided with openings 113, so that as the weight 12 reciprocates with respect to the frame 11, the rollers 111 may freely move in the slots 113 whilst bearing against the inside of the cutter arm 13.

*Description of mechanism for arresting lunging movement of the reciprocating weight*

The reciprocating weight 12 has been described as imparting an impulse upon changes in momentum thereof into the cutter arm 13 linked thereto. Under certain conditions when resistance is no longer afforded by the bench 16, the inertia of the reciprocating weight 12 will cause it to lunge in a direction parallel to and toward the cutter tip 14 of the cutter arm 13. In order to prevent such lunging movement of the reciprocating weight 12, it is restrained partly in such movement until it again resumes a motion which is consistent with or is a function of its mass as compared with the mass of the cutter arm 13.

Figure 6:
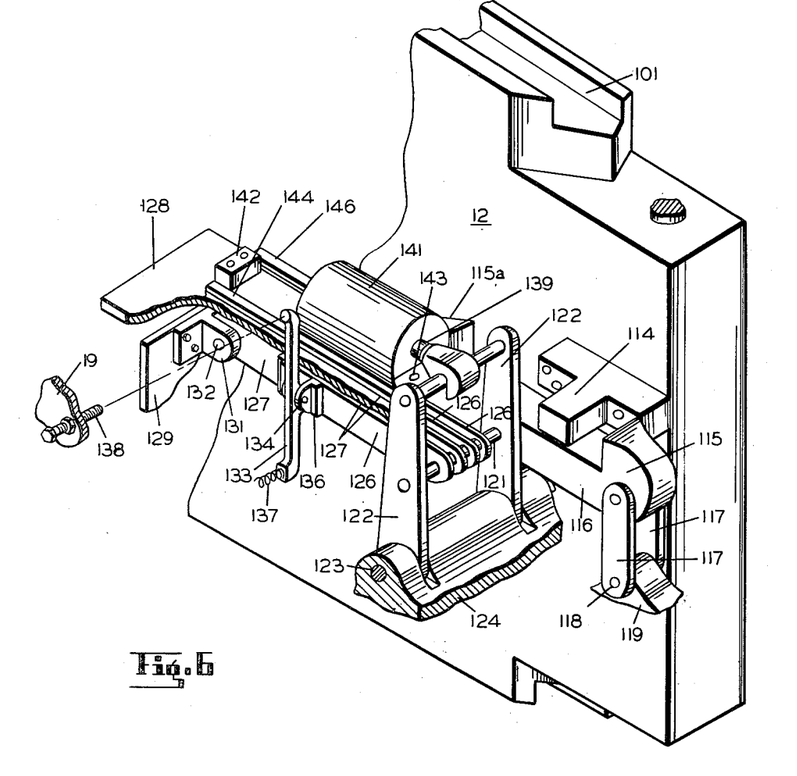
Fig. 6 is a perspective view of a snubbing device for checking the movement of the reciprocating weight when the pick is no longer encountering resistance.

As seen more particularly in Figs. 4 and 6, the weight 12 is provided at the forward end thereof with a lug 114 which engages abutments 115 or 115a disposed on a stop arm 116 pivotally connected to a pair of rock arms 117 hingedly connected at 118 to an abutment 119 extending upward from the bottom plate point 22. The stop arm 116 is connected to a pin shaft 121 of a combined brake applying and return arm 122 which is hingedly connected at 123 to a fixed abutment 124 also extending upward from the bottom plate 22. The pin shaft 121 provides a support for a plurality of brake shoes 126 spaced thereon, each brake shoe 126 being spaced by blocks of frictional material 127 which are anchored at their ends remote from the rock arms 117 on pins 132 passing through angle members 131 extending from an abutment plate 129, said abutment plate depends from the underside of a support plate 128 extending inward from the wall 19 and secured thereto in any convenient fashion.

The amount of pressure between the brake shoes 126 and the blocks of friction material 127 is adjusted by a brake adjusting arm 133 which is pivoted at 134 substantially centrally thereof to a pressure plate 136 which bears against the outermost brake shoe 126. One end of the adjusting arm 133 bears against a spring 137 bearing against the inside of the wall 19, the amount of pressure between the brake shoes 126 and the lining material 127 being adjusted by a set screw 138 bearing against the other end of the arm 133 and threaded into the front wall 19.

The pressure plate 136 is preferably formed integrally with an arm, not shown, which extends beneath the brake shoes 126 and the friction blocks 127 for support thereof.

It will be seen that when the weight 12 lunges in a forward direction, that is, in a direction toward the right as seen in Figs. 3 and 4, the lug 114 will engage the abutment 115 on the arm 116 which in turn will rock the brake applying arm 122 in a clockwise direction as seen in Fig. 6, causing a braking action between the brake shoes 126 and the lining material 127, thereby arresting the lunging movement of the weight 12.

The brake applying and the return arm 122 has connected thereto a piston rod 139 which is slidable with a piston, not shown, within a floating cylinder 141 which moves between spaced abutments 142 and 143 on the support plate 128, being guided between the spaced abutments 142 and 143 by spaced rails 144 and 146. Prior to the action previously described, that is when the weight 12 lunges to the right as seen in Fig. 4, the piston rod end of the cylinder 141 is in engagement with the abutment 143, air being trapped at super-atmospheric pressure between the piston thereof and the piston rod end of the cylinder 141.

The lunging movement of the weight 12 will cause the brake applying arms 122 to rock in a clockwise direction as previously described, at the same time moving the piston within the cylinder 141 towards the piston rod end thereof. The force against the piston within the cylinder 141 is sufficient to overcome the friction between the brake shoes 126 and the brake lining 127 so that the arm 122 may be rocked slowly in a counter-clockwise direction causing the arm 116 to return to its normal position, that is when the piston within the cylinder 141 has moved to the cylinder head end thereof.

Meanwhile the weight 12 will have commenced once more to have resumed its normal reciprocating movement, and the brake applying arm 116 and the floating abutment 115 will be in position once more to arrest the lunging movement of the weight 12 at times when the pick 13 is no longer encountering resistance from the bench 16.

Under conditions when the machine 10 is operated in a direction from the right to the left, the lack of resistance afforded by the seam 17 will cause the weight 12 to lunge to the left as seen in Fig. 6. Under such condition of operations the cylinder 141 is charged with air at super-atmospheric pressure between the piston and the cylinder head end thereof until the cylinder 141 is in engagement with the abutment 142. It is obvious, of course, that suitable means may be provided to charge the cylinder 141 at either the cylinder head end or the piston rod end thereof.

Under such latter conditions of operation of the machine 10, and at times when the weight 12 lunges to the left, as has been described, the lug 114 will engage the floating abutment 115a on the brake applying arm 116 causing a similar operation of the brake as previously described, but in an opposite direction. However, the air trapped between the cylinder head and the piston of the cylinder 141 will cause the arm 122 to be rocked in a clockwise direction as seen in Fig. 6 until the assembly is returned to its normal position with the piston of the cylinder 141 bearing against the piston rod end thereof.

Operation

In the operation of the mining machine according to the present invention it is advanced by the crowd chain 43 against a longwall face as seen in Fig. 1. The impulse transmitting mechanism located within the space defined by the frame 11 and the housing 18 is driven from the motor 44. The crowding effect of the draft chain 43 may be of the order of 8,000 pounds, but when reciprocating movement is given to the weight 12 by the motor 44, and the gear train and linkage previously described, there will be at times an instantaneous impulse transmitted against the cutter 14 of the order of 25,000 pounds.

Prior to the contact by the cutter 14 with the seam 17 the cutter will have a reciprocating motion with a longer stroke as compared to the stroke of the weight 12, the difference in magnitude of such strokes being in accordance with the ratio of the mass of the reciprocating weight 12 to the mass of the cutter arm 13. When the cutter 14 comes into contact with the coal seam its stroke decreases but the stroke of the weight 12 increases until the resistance of the coal becomes equal to the low accelerating force of the weight 12. As long as the resistance of the coal exceeds the force of the low acceleration of the weight 12, the cutter 14 will continue to contact the coal seam 17. In fragmenting the coal against any higher resistance the advance of the cutter will be intermittent while the feed movement by the draft chain will be reasonably constant. The bell crank 83 affording the connection between the weight 12 and the cutter 14 enables intermittent advancing of the cutter head 14 while the crowd from the draft chain 43 will be maintained substantially uniform. While such crowd is maintained at the uniform rate and the cutter fails to move in accordance with such crowd movement the cam follower 106 will move along the V-cam surface 104.

At the beginning of a cutting cycle the weight 12 is accelerated toward the cutter 14 but the reacting force from this acceleration is opposed by the crowding force from the draft chain 43. As long as the crowding due to the draft chain 43 is greater than the reacting force induced by the weight 12 in its low acceleration rate toward the cutter 14, the cutter will be held in contact with the coal with a force which is equal to the difference between the crowding force and the reacting force. Near the end of the forward stroke of the weight 12 its motion is changed to one of rapid deceleration, and the force of the deceleration plus the crowd force are applied together to the cutter 14. This combined force is maintained during the rapid backward acceleration of the weight 12 and during this period such force is maintained the cutter 14 will advance into the bench 16 with increasing velocity. When the velocity of the cutter 14 attains a value which is in excess of that caused by the crowd of the draft chain alone the V-cam 104 will enable the cutter 13 to advance with respect to any advance which would normally be achieved by the crowd alone.

At the point where rapid backward acceleration of the weight 12 ceases with respect to the cutter 13 the cutter may be moving forward with considerable velocity. The weight 12 has a definite relative motion with respect to the cutter 14 which would enable the weight to be moving backward relative to the cutter 13, but since the cutter may have a forward velocity which may be higher than the maximum relative velocity of the weight 12, the absolute motion of the weight 12 may be still in a forward direction. At this point the motion of the weight changes to one of slow reverse deceleration with forces which are in a direction to retard the weight 12, but the absolute forward momentum of the weight 12 and the cutter 13 will cause the cutter to continue to advance with a decreasing velocity until its motion ceases, where it remains in contact with the face of the seam until the high forces are applied during the succeeding cycle of the weight and the cutter.

The highest force which can be applied by the cutter 13 is when the cutter is stalled against material which it cannot penetrate. Obviously, if the resistance of the material is less than the stalling force against the cutter the coal will be fragmented from the seam and the cutter will be accelerated in a forward direction, the high forces of deceleration and backward acceleration of the weight 12 being reduced by such force of acceleration of the cutter in a forward direction.

The V-cam 104 also provides a means for correcting the tendency of the cutter to accelerate when resistance is no longer afforded by the coal seam. Without the V-cam surface the cutter would normally lunge forward, but the resistance to the movement of the piston rod 107 of the cylinder 109 prevents such lunging movement, any lunging movement permitted causing the roller 107 to ride on one of the V-cam surfaces.

Under conditions when it is desired to operate the miner from the right to the left as seen in the several figures, the operating handle 66 as seen in Fig. 5 is rocked to a position whereby the spline clutch 61 causes the eccentric pinion 58 to be made fast to the shaft 52 thereby affording a driving connection to the variable speed gear 75. It will be noticed that the eccentric driving pinions 58 and 59 are disposed 180° apart as are the varying speed gears 76 and 77, so that the sequence of operations obtaining as previously described will be carried on, but in the reverse direction, the cutter tip 14a then engaging the seam to shear or plane the coal therefrom.

In either direction of operation the draft means 43 will move the machine 10 along the tubular rail 38 as seen in Fig. 5, one of the winches or hoisting means being inoperable according to the direction of the machine along the rail 38.

It may be noticed that the double strand flight conveyor 31 is advanced together with the machine 10 as the coal is completely fragmented from the seam after a complete pass thereof along the face. Jacks, not shown, or suitable hydraulic means may be interposed between the outer channel 32 and a fixed abutment, so that when a pass is completed the conveyor 31 together with the machine 10 may be moved to another position for a subsequent pass in an opposite direction along the face 17.

The mechanical miner according to the present invention presents many advantages, one being that relatively large fragments of coal are cut from the seam by its use. The machine according to its present invention is also capable of use without the necessity of extremely large crowding forces for moving the machine and its cutter along the face, such as has been necessary with machines of the prior art where the coal is sheared or planed from the seam by brute force. Since the coal is not subjected to the tearing action of cutter bits such as are used in conventional continuous miners, the presence of dust at the working face is minimized to a great extent. The provision of the deflecter vanes at each end of the machine enables the coal fragmented from the seam to fall readily upon the flight conveyor 31 to be transmitted from the working face with a minimum of handling.

Since the machine according to the present invention is particularly adapted for the long wall method of mining, the total amount of coal capable of being removed in a mining operation is much greater than is possible by the conventional room and pillar method.

While the invention has been described in terms of a preferred embodiment thereof its scope is not intended to be limited by the precise embodiment herein shown nor otherwise than by the terms of the claims here appended.

I claim:

1. In a mechanical miner particularly adapted to move with respect to a longwall face of a seam of frangible material, a frame having draft means located at each end of said longwall and connected to said frame for moving said frame with respect to said face, a conveyor disposed alongside said frame and forming a means for supporting said frame for movement therealong, a cutter arm arranged to move with said frame and with respect to said frame and having a cutter at each end thereof for contacting said face according to the direction of movement of said frame so as to plane or plow material from said seam, a reciprocating weight supported by said frame and arranged to reciprocate with respect to said cutter, a motor for imparting reciprocating movement to said weight with respect to said cutter, said motor providing for acceleration of said weight during the major portion of its travel when said weight is moving in a direction towards said cutter, a linkage connecting said weight and said cutter for transmitting an impulse into said cutter from said weight in response to changes in momentum of the latter, means selectively driven from said motor so as to provide desired reciprocating movement to said weight according to the direction of said frame along said conveyor, and means for arresting said weight in its travel toward said cutter when said cutter is no longer encountering resistance from said seam, said last named means being operable irrespective of the direction of movement of said frame along said conveyor.

2. In a mechanical miner particularly adapted to move with respect to a longwall face of a seam of frangible material, a frame having draft means located at each end of said longwall and connected to said frame for moving said frame with respect to said face, a conveyor disposed alongside said frame and forming a means for supporting said frame for movement therealong, a cutter arm arranged to move with said frame and with respect to said frame and having a cutter at each end thereof for contacting said face according to the direction of movement of said frame so as to plane or plow material from said seam, a reciprocating weight supported by said frame and arranged to reciprocate with respect to said cutter, a motor for imparting reciprocating movement to said weight with respect to said cutter, said motor providing for acceleration of said weight during the major portion of its travel when said weight is moving in a direction towards a cutter in contact with said face, a linkage connecting said weight and said cutter for transmitting an impulse into said cutter from said weight in response to changes in momentum of the latter, and means selectively driven from said motor so as to provide desired reciprocating movement to said weight according to the direction of said frame along said conveyor.

3. In a mechanical miner particularly adapted to move with respect to a longwall face of a seam of frangible material, a frame having draft means located at each end of said longwall and connected to said frame for moving said frame with respect to said face, a cutter arm arranged to move with said frame and with respect to said frame and having a cutter at each end thereof contacting said face according to the direction of movement of said frame so as to plane or plow material from said seam, a reciprocating weight supported by said frame and arranged to reciprocate with respect to said cutter, a motor for imparting reciprocating movement to said weight with respect to said cutter, said motor providing for acceleration of said weight during the major portion of its travel when said weight is moving in a direction towards said cutter, a linkage connecting said weight and said cutter for transmitting an impulse into said cutter from said weight in response to changes in momentum of the latter, means selectively driven from said motor so as to provide desired reciprocating movement to said weight according to the direction of movement of said frame along said seam, and means for arresting said weight in its travel toward said cutter when said cutter is no longer encountering resistance from said seam, said last named means being operable irrespective of the direction of movement of said frame along said seam.

4. In a mechanical miner particularly adapted to move with respect to a longwall face of a seam of frangible material, a frame having draft means located at each end of said longwall and connected to said frame for moving said frame with respect to said face, a cutter arm arranged to move with said frame and with respect to said frame and having a cutter at each end thereof contacting said face according to the direction of movement of said frame so as to plane or plow material from said seam, a reciprocating weight supported by said frame and arranged to reciprocate with respect to said cutter, a motor for imparting reciprocating movement to said weight with respect to said cutter, said motor providing for acceleration of said weight during the major portion of its travel when said weight is moving in a direction towards said cutter, a linkage connecting said weight and said cutter for transmitting an impulse into said cutter from said weight in response to changes in momentum of the latter, and means selectively driven from said motor so as to provide desired reciprocating movement to said weight according to the direction of movement of said frame along said seam.

5. In a mechanical miner particularly adapted to move with respect to a longwall face of a seam of frangible material, a frame having draft means located at each end of said longwall and connected to said frame for moving said frame with respect to said face, a cutter arm arranged to move with said frame and with respect to said frame and having a cutter at each end thereof for contacting said face according to the direction of movement of said frame so as to plane or plow material from said seam, a reciprocating weight supported by said frame and arranged to reciprocate with respect to said cutter arm, a motor for imparting reciprocating movement to said weight with respect to said cutter arm, said motor providing for acceleration of said weight during the major portion of its travel when said weight is moving in a direction towards said cutter, and a linkage connecting said weight and said cutter for transmitting an impulse into said cutter from said weight in response to changes in momentum of the latter, and gear means interposed between said motor and said reciprocating weight for selectively reciprocating said weight with desired velocity and acceleration characteristics according to the direction of movement of said frame.

References Cited in the file of this patent

UNITED STATES PATENTS

| Number | Name | Date |
|---|---|---|
| 2,565,528 | Sloane | Aug. 28, 1951 |
| 2,610,841 | Pearson et al. | Sept. 16, 1952 |

FOREIGN PATENTS

| Number | Country | Date |
|---|---|---|
| 647,491 | Great Britain | Dec. 13, 1950 |